United States Patent
Gilbert et al.

(10) Patent No.: US 10,311,485 B2
(45) Date of Patent: Jun. 4, 2019

(54) SYSTEM, METHOD AND COMPUTER PROGRAM PRODUCT FOR EXTRACTING USER PROFILES AND HABITS BASED ON SPEECH RECOGNITION AND CALLING HISTORY FOR TELEPHONE SYSTEM ADVERTISING

(71) Applicant: III Holdings 1, LLC, Wilmington, DE (US)

(72) Inventors: Arlo Christopher Gilbert, Greenwich, CT (US); Andrew Muldowney, Astoria, NY (US)

(73) Assignee: III HOLDINGS 1, LLC, Wilmington, DE (US)

( * ) Notice: Subject to any disclaimer, the term of this patent is extended or adjusted under 35 U.S.C. 154(b) by 0 days.

(21) Appl. No.: 15/681,892

(22) Filed: Aug. 21, 2017

(65) Prior Publication Data

US 2018/0060917 A1    Mar. 1, 2018

Related U.S. Application Data

(63) Continuation of application No. 14/706,849, filed on May 7, 2015, now Pat. No. 9,741,055, which is a continuation of application No. 13/768,436, filed on Feb. 15, 2013, now Pat. No. 9,053,496, which is a continuation of application No. 13/300,461, filed on
(Continued)

(51) Int. Cl.
| | | |
|---|---|---|
| *H04M 1/54* | (2006.01) | |
| *G06Q 30/02* | (2012.01) | |
| *H04W 4/12* | (2009.01) | |
| *H04W 4/02* | (2018.01) | |
| *G10L 15/26* | (2006.01) | |
| *H04M 3/487* | (2006.01) | |
| *G10L 15/22* | (2006.01) | |

(Continued)

(52) U.S. Cl.
CPC ..... *G06Q 30/0269* (2013.01); *G06Q 30/0261* (2013.01); *G10L 15/26* (2013.01); *G10L 15/265* (2013.01); *H04M 3/4878* (2013.01); *H04W 4/02* (2013.01); *H04W 4/12* (2013.01); *G10L 15/22* (2013.01); *H04M 3/2281* (2013.01); *H04M 3/42102* (2013.01); *H04M 2201/40* (2013.01)

(58) Field of Classification Search
CPC .................................................. H04M 3/53333
USPC ........................................ 379/88.14, 114.13
See application file for complete search history.

(56) References Cited

U.S. PATENT DOCUMENTS

| | | |
|---|---|---|
| 5,278,943 A | 1/1994 | Gasper et al. |
| 5,805,784 A | 9/1998 | Crawford |

(Continued)

OTHER PUBLICATIONS

Bloch, M., "Pay Per Call, PPCall and Call on Select Marketing Guide," Pay Per Call and Click to Call Guide, Taming the Beast.Net, Jan. 2006, <http://www.tamingthebeast.net/articles6/click-pay-per-call.htm>, [retrieved Nov. 16, 2017], 4 pages.

(Continued)

*Primary Examiner* — Van D Huynh
(74) *Attorney, Agent, or Firm* — Christensen O'Connor Johnson Kindness PLLC

(57) ABSTRACT

A system, method and computer program product for providing targeted messages to a person using telephony services by generating user profile information from telephony data and using the user profile information to retrieve targeted messages.

15 Claims, 4 Drawing Sheets

Related U.S. Application Data

Nov. 18, 2011, now Pat. No. 8,411,830, which is a continuation of application No. 11/625,684, filed on Jan. 22, 2007, now Pat. No. 8,090,082.

(60) Provisional application No. 60/743,159, filed on Jan. 23, 2006.

(51) Int. Cl.
*H04M 3/22* (2006.01)
*H04M 3/42* (2006.01)

(56) References Cited

U.S. PATENT DOCUMENTS

| | | | |
|---|---|---|---|
| 5,810,599 A | 9/1998 | Bishop | |
| 5,890,146 A | 3/1999 | Wavish et al. | |
| 6,018,768 A | 1/2000 | Ullman et al. | |
| 6,064,854 A | 5/2000 | Peters et al. | |
| 6,409,599 B1 | 6/2002 | Sprout et al. | |
| 6,554,707 B1 | 4/2003 | Sinclair et al. | |
| 6,615,171 B1 | 9/2003 | Kanevsky et al. | |
| 6,683,941 B2 | 1/2004 | Brown et al. | |
| 6,714,793 B1 | 3/2004 | Carey et al. | |
| 6,760,580 B2 | 7/2004 | Robinson et al. | |
| 6,819,759 B1 | 11/2004 | Khuc et al. | |
| 6,839,414 B1 | 1/2005 | Enzmann et al. | |
| 7,103,172 B2 | 9/2006 | Brown et al. | |
| 7,123,816 B2 | 10/2006 | McGrath et al. | |
| 7,130,401 B2 | 10/2006 | Rampey et al. | |
| 7,184,540 B2 | 2/2007 | Dezonno et al. | |
| 7,215,759 B2 | 5/2007 | Brown et al. | |
| 7,324,826 B2 | 1/2008 | Carey et al. | |
| 7,372,952 B1 | 5/2008 | Wu et al. | |
| 7,400,711 B1 * | 7/2008 | Ford | H04M 3/20 379/114.13 |
| 7,542,553 B2 | 6/2009 | Gurfein et al. | |
| 7,716,291 B2 | 5/2010 | Thorson | |
| 7,724,887 B2 | 5/2010 | Jennings et al. | |
| 7,788,248 B2 | 8/2010 | Forstall et al. | |
| 7,864,944 B2 | 1/2011 | Khouri et al. | |
| 8,019,363 B2 | 9/2011 | Robinson et al. | |
| 8,023,622 B2 | 9/2011 | Timmins et al. | |
| 8,090,082 B2 | 1/2012 | Gilbert et al. | |
| 8,208,608 B2 | 6/2012 | Simpson et al. | |
| 8,265,933 B2 | 9/2012 | Bates et al. | |
| 8,411,830 B2 | 4/2013 | Gilbert et al. | |
| 8,755,828 B2 | 6/2014 | Carey et al. | |
| 2001/0012777 A1 | 8/2001 | Igarashi et al. | |
| 2002/0022492 A1 | 2/2002 | Barak et al. | |
| 2002/0046104 A1 | 4/2002 | Kaddeche et al. | |
| 2002/0051521 A1 * | 5/2002 | Patrick | H04M 3/4878 379/88.01 |
| 2002/0067809 A1 | 6/2002 | Won | |
| 2002/0082832 A1 | 6/2002 | Nagashima | |
| 2002/0164004 A1 | 11/2002 | Tamura et al. | |
| 2002/0174436 A1 | 11/2002 | Wu et al. | |
| 2002/0178002 A1 * | 11/2002 | Boguraev | G06F 17/277 704/235 |
| 2003/0009682 A1 | 1/2003 | Wallace et al. | |
| 2003/0061039 A1 | 3/2003 | Levin | |
| 2003/0182124 A1 | 9/2003 | Khan | |
| 2004/0027366 A1 | 2/2004 | Takatori et al. | |
| 2004/0091093 A1 * | 5/2004 | Bookstaff | H04M 3/4874 379/201.01 |
| 2004/0181407 A1 | 9/2004 | Trinkel et al. | |
| 2005/0015197 A1 | 1/2005 | Ohtsuji et al. | |
| 2006/0104293 A1 | 5/2006 | Kopp et al. | |
| 2006/0184410 A1 | 8/2006 | Ramamurthy et al. | |
| 2006/0187336 A1 | 8/2006 | Rosenberg | |
| 2006/0206454 A1 | 9/2006 | Forstall et al. | |
| 2006/0245576 A1 | 11/2006 | Henry | |
| 2006/0259294 A1 | 11/2006 | Tashereau | |
| 2006/0269253 A1 | 11/2006 | McGrath et al. | |
| 2007/0071206 A1 | 3/2007 | Gainsboro et al. | |
| 2007/0105072 A1 | 5/2007 | Koljonen | |
| 2007/0168462 A1 | 7/2007 | Grossberg et al. | |
| 2007/0174258 A1 * | 7/2007 | Jones | G06Q 30/02 |
| 2007/0201636 A1 | 8/2007 | Gilbert et al. | |
| 2007/0283384 A1 * | 12/2007 | Haeuser | H04N 7/165 725/34 |
| 2007/0286072 A1 | 12/2007 | Baumard | |
| 2008/0064371 A1 | 3/2008 | Madhavapeddi et al. | |
| 2008/0086402 A1 * | 4/2008 | Patel | G06Q 20/108 705/35 |
| 2008/0109222 A1 | 5/2008 | Liu | |
| 2008/0260114 A1 * | 10/2008 | Siminoff | H04M 3/5322 379/88.14 |
| 2009/0241115 A1 * | 9/2009 | Raffo | G06Q 30/02 718/100 |
| 2010/0184409 A1 * | 7/2010 | Doulton | H04L 51/066 455/412.1 |
| 2010/0325100 A1 | 12/2010 | Forstall et al. | |
| 2011/0268260 A1 * | 11/2011 | Madhavapeddi | G06Q 10/00 379/88.13 |
| 2011/0282972 A1 | 11/2011 | Rosen | |
| 2012/0063576 A1 | 3/2012 | Gilbert et al. | |
| 2013/0084900 A1 | 4/2013 | Carey et al. | |
| 2013/0156173 A1 | 6/2013 | Gilbert et al. | |
| 2014/0229981 A1 * | 8/2014 | Alexander | H04N 5/44543 725/34 |

OTHER PUBLICATIONS

PCT International Search Report, dated Oct. 26, 2007, in corresponding International Application No. PCT/US07/060899, filed Jan. 23, 2007, 4 pages.

Walker, W., et al., "Sphinx-4: A Flexible Open Source Framework for Speech Recognition," Technical Report SMLI TR2004-0811, Sun Microsystems Inc., 2004, 18 pages.

Written Opinion of the International Searching Authority dated Oct. 26, 2007, in corresponding International Patent Application No. PCT/US07/60899, filed Jan. 23, 2007, 4 pages.

\* cited by examiner

SYSTEM, METHOD AND COMPUTER PROGRAM PRODUCT FOR EXTRACTING USER PROFILES AND HABITS BASED ON SPEECH RECOGNITION AND CALLING HISTORY FOR TELEPHONE SYSTEM ADVERTISING

CROSS REFERENCE TO RELATED APPLICATIONS

This application is a continuation of U.S. patent application Ser. No. 14/706,849, filed May 7, 2015 (now U.S. Pat. No. 9,741,055), which is a continuation of U.S. patent application Ser. No. 13/768,436, filed Feb. 15, 2013 (now U.S. Pat. No. 9,053,496), which is a continuation of U.S. patent application Ser. No. 13/300,461, filed Nov. 18, 2011 (now U.S. Pat. No. 8,411,830), which is a continuation of U.S. patent application Ser. No. 11/625,684, filed Jan. 22, 2007 (now U.S. Pat. No. 8,090,082), which claims the benefit of U.S. Provisional Patent Application No. 60/743,159, filed Jan. 23, 2006, each of which is incorporated by reference in its entirety.

BACKGROUND

Voice communication encompasses a rapidly evolving mix of technologies. A relatively recent communication technology that has garnered a lot of attention is Voice over Internet Protocol, referred to as VoIP. VoIP can use the Internet to transmit telephony data (voice and control data associated with a VoIP telephone call) in order to provide voice services to consumers. The Internet is a publicly accessible worldwide system of interconnected computer networks that transmit data using a standardized Internet Protocol (IP) as well as other standard and accepted data transmission protocols such as Transport Control Protocol (TCP) and User Datagram Protocol (UDP). It is made up of thousands of smaller commercial, academic, domestic, and government networks and is used to transmit and host various information and services, such as electronic mail, online chat, and the interlinked Web pages and other documents on the World Wide Web (WWW).

The main attraction of VoIP technology to businesses and consumers is the lower cost. VoIP technology has been adopted for use by businesses and consumers as a substitute for existing landline or mobile telephone services that use expensive cellular networks and/or the Packet Switched Telephone Network (PSTN). By using VoIP, a consumer can make telephone calls using a broadband Internet connection instead of a regular landline or mobile telephone. VoIP voice data is transmitted over a packet-switched network by breaking down voice signals into packets of digital data from the transmitting end of a telephone call (or a computer equipped with a microphone), then sending the data over the Internet using UDP (User Datagram Protocol) to the receiving end of the call. The voice signals are reassembled and played at the handset (telephone) at the receiving end of the telephone call (or through a computer if it is being used in lieu of a telephone handset to receive and place VoIP telephone calls). Control data used to initiate a VoIP telephone call is also transmitted over the Internet.

Because it can utilize existing data communication infrastructure put in place for Internet data transfer, the overhead for a VoIP service provider is less than that of the more traditional telephone service providers that typically install, maintain, and upgrade their respective networks and communications equipment. As described in more detail below, the VoIP service providers do have to provide some equipment to manage their network of VoIP handsets (telephones) or computers, but such equipment is less expensive to install, maintain, and update than the network infrastructure supporting the more traditional voice communication telephone network (known as PSTN or Public Switched Telephone Network). The reason for the lower cost is that the VoIP service providers can leverage the already existing packet-switched network infrastructure in place to transfer data over the Internet (or over an Intranet for a business). Furthermore, voice communication over PSTN operates over a circuit-switched, rather than packet-switched, protocol. Therefore, an active call requires a 64-kps connection between the parties that cannot be used for any other purpose during the call, and is billed by the service provider accordingly. In contrast, the VoIP packet-switched approach allows bandwidth that is not being used by the voice data to be allocated to other purposes.

It would be beneficial to be able to further lower the cost of providing VoIP service to consumers. By lowering the cost of its service, a VoIP service provider will be able to attract a greater number of consumers currently using traditional PSTN and mobile telephone networks. Lower cost is the primary attraction of consumers to VoIP to begin with. So, further reduction in cost will naturally lead to more consumer interest. Additionally, if an individual service provider can provide a lower cost service that is otherwise comparable in quality and features to competing VoIP service providers, the more affordable provider will benefit from customer migration from other VoIP service providers, because the main incentive for such customers to switch to VoIP in the first place was to achieve greater cost savings.

One of the most common business models used for generating income through the use of media is advertising. Many businesses successfully use advertising revenue as a primary business model through the Internet. Many more Internet-based businesses supplement other revenue streams through advertising. Traditionally, advertising through telephone calls has been limited. It has mostly consisted of telemarketing calls or prerecorded messages played while a consumer is on hold for some other purpose. Telemarketing advertisements can either be random or targeted but are not typically initiated by the service provider and therefore do not provide a traditional revenue stream to service providers that can offset the cost of such a service.

However, if a service provider can reliably deliver effective advertisements to its customers it would naturally be able to use a portion of the advertising revenue to offset the cost of providing the service. So, for example, if an advertisement can be delivered to a VoIP consumer on that consumer's telephone, for example, as a voice message preceding the phone call (there are many other ways to effectively deliver such an advertisement, some of which are discussed below), then the income generated from the advertisement can be used to offset, or eliminate, the actual cost of the telephone call to the consumer. The challenge is to be able to deliver effective targeted advertisements to such consumers.

Consumers who would receive such advertisements would understand that they are receiving discounted service costs in exchange for having to listen to or view the advertisement. However, advertisements that have no relevance to these consumers would be annoying to them, and after experiencing frustration with viewing irrelevant advertisements, such consumers might instead optionally choose to pay more money for an advertisement-free service. Therefore, there is a need for a system that allows the service provider to send targeted advertisements to these consumers. Such targeted advertisements would be directed to those consumers' perceived interests or needs and would therefore not be annoying (or as annoying) for the consumers to view or listen to. Furthermore, advertisers would be willing to pay more money if their advertisements were being targeted to customers with a particular interest in their products or services.

Advertising revenue is generated by many on-line businesses. There are even advertising networks (also known as online advertising networks or ad networks) that represent a number of web sites that sell online advertising space, allowing advertisers to reach broad audiences relatively easily through a single package deal purchase. Often these advertisers pay per click, i.e., they pay a predetermined price for every click on their advertisement by a web user (such clicks will often bring the web user to the advertiser's website). Advertising networks provide a way for media buyers to coordinate advertising campaigns across dozens, hundreds, or even thousands of sites in an efficient manner. The campaigns often involve running advertisements over a category (run-of-category) or an entire network (run-of-network).

Another online advertising method is called opt-in e-mail advertising (also known as permission marketing), which communicates an advertisement by e-mail where the recipient of the advertisement has consented to receive it. Often the consent is the result of offers of free merchandise in exchange for filling out a survey. Some of the advantages of this method are that it provides a direct contact with the consumer and is inexpensive, flexible, and simple to implement. By using the information in the survey, in some cases, the advertisements may, to some extent, be targeted to the consumer's interests. However, unlike the targeted advertisements achieved through the present disclosure, there is no incentive for the consumer to continue to receive or view the advertisements after receiving their free merchandise.

Another method of online advertising is spamming. Spamming is the sending of unsolicited e-mails, usually trying to sell products or services, to web users. While spamming can be economically viable because advertisers have very few operating costs beyond the management of their mailing lists, it is widely reviled due to the often unacceptable content of the e-mails as well as being an annoying distraction to e-mail users that do not wish to receive them but have to take time to delete the spam e-mails from their inboxes. That is why spamming restrictions have been the subject of legislation in a number of jurisdictions. Spamming also presents a problem because the volume of unsolicited mail it creates results in costs borne by the Internet service providers (which is, in turn, indirectly borne by the service providers' customers); the service providers may be forced to add extra capacity to cope with the increase in bandwidth or alternatively provide a slower service to its customers.

Contextual advertising is where advertising networks display text-only advertisements that correspond to the keywords of an Internet search or to the content of the page on which the advertisement is shown. Contextual advertisements are believed to have a greater chance of attracting a user because they are based on the user's search query as that correlates to the user's interest at the time of query. Contextual advertising can be seen, for example, in a search query for "wine" which may return an advertisement for a wine seller's website.

GOOGLE ADSENSE, for example, implements contextual advertising by providing its website customer with JavaScript code that, when inserted into its web pages, generate relevant advertisements from the GOOGLE inventory of advertisers. The relevance of the advertisements shown is calculated by a separate GOOGLE program that indexes the content of the web page.

Telephone advertising by telemarketers is accomplished through the use of live sales people or pre-recorded messages. An example of live telephone advertising is where a sales representative calls a consumer on the telephone to sell products or services. Pre-recorded telephone advertising is also used when a caller is put on hold while trying to reach an operator or customer service. For example, a pre-recorded telephone advertisement about a new model television being offered by an electronics manufacturer might be played while a caller is put on hold while trying to reach technical support.

With the increasing popularity of VoIP, telephone advertising has also been modified and inserted into VoIP calls. For example, a pre-recorded advertisement may be inserted immediately before a VoIP call is connected. Further, since many VoIP calls are initiated using a computer, advertisements may be continuously displayed on the computer screen while a VoIP call is in session. Alternatively, if the VoIP call is being initiated from a telephone that has a video screen, the advertisement could be displayed on that screen. However, as discussed above, such random advertisements may annoy the VoIP consumers and cause them to choose an advertisement-free service.

Speech recognition technologies allow computers to convert wave forms of human speech into text. A typical system for accomplishing speech recognition consists of a computer equipped with a microphone and special speech recognition software. The microphone might also be used to convert the analog voice wave form into digital data representing the spoken voice so that it can be analyzed and converted to textual form by the software running on the computer. One well-known speech recognition technique used in such software extracts the sounds that group together to form words, referred to as phonemes, from the digital data. Once these phonemes have been extracted and recognized, they are converted into textual words. A common method of converting these phonemes into words is through the use of a hidden Markov model (HMM). An HMM is a statistical model that is applied to a set of phonemes to generate the most likely corresponding words.

Speech recognition technologies are often used in transcription. For example, speech recognition can be used by people to interact with a computer who would otherwise have difficulty using a keyboard, such as people with physical limitations like carpal tunnel syndrome. Speech recognition is also used in legal and medical transcription and for the generation of subtitles for television programs. Many automated telephone services' directory systems also employ speech recognition. For example, there are automated telephone-based directory systems for travel booking and information, financial account information, customer service call routing, and directory assistance that utilize speech recognition technology.

Since under VoIP, the voice data can be (and usually is for VoIP consumers) transmitted via the Internet, there is no premium for long-distance or international calling, which is one of the ways that consumers benefit from cost savings. By analogy, when an Internet user accesses a web page in the United Kingdom from the United States, he or she does not pay any kind of premium international rate but rather only the cost incurred for the basic fee from the Internet service provider. Similarly, for example, under VoIP, a telephone call placed from the United States to the United Kingdom might have no premium charges associated with an international call.

Typically, VoIP voice packets (sometimes referred to as the bearer packets) are transmitted using UDP over IP. UDP is one of the core protocols used in the Internet protocol suite. UDP is used by programs running on networked computers to send datagrams (short packets of information) to each other. UDP is more suited to voice communication data than other packet-switched data transmission protocols such as Transport Control Protocol (TCP) because UDP is faster and more efficient, which are very important characteristics for the successful transmission of real-time voice data. TCP, on the other hand, is better suited for reliability because it has built in error checking functionality.

There are several types of VoIP call-control protocols. H.323 is the most widely deployed. Other protocols used include Simple Gate Control Protocol (SGCP), Internet Protocol Device Control (IPDC), Media Gateway Control Protocol (MGCP), and Session Initiation Protocol (SIP). Some of these protocols, such as H.323, were created to deal with real-time multimedia transmission over an unreliable data network but not specifically created for VoIP. H.323 is a standard protocol approved by the International Telecommunication Union (ITU) in 1996 to promote voice transmission over the Internet and provide mechanisms for voice and video communication and data collaboration.

These protocols are interchangeably used in connection with VoIP to accomplish the same thing, i.e., to accomplish call-flow over the packet-switched network. Typically, the VoIP service provider will maintain a call manager that is used to establish the VoIP calls. When a consumer initiates a call from his VoIP handset (or computer), the control data will be transmitted to the call manager via the packet-switched network. The call manager will then establish the call by transmitting control data back to the IP address of both the initiating end and the receiving end of the call, letting them know to initiate the normal call protocols (such as causing the phone to ring at the destination end) and transmit the packetized voice (bearer) data directly to each other's IP addresses once a call is initiated. So, the call manager maintains a list of VoIP calls that can translate telephone numbers into IP addresses as appropriate if both handsets are on the VoIP network.

A gateway typically is established and maintained by the VoIP service provider to make the connection to/from the PSTN network. If, for example, the VoIP-initiated destination call's destination is in the PSTN network, then the gateway establishes a circuit-switched call on the PSTN network—which is a circuit-switched rather than packet-switched network that employs time division multiplexing (TDM). In that case, once the call is established the VoIP voice (or bearer) packets will be transmitted to the IP address of the gateway which will be expecting those packets after receiving the control data from the manager and will, in turn, transmit the voice data to the destination over the PSTN network using TDM.

Similarly, telephone calls coming from the PSTN network that are destined to a VoIP pass through a similar gateway that will convert the TDM call data into a packet-switched format for transmission over an IP network. There may also be VoIP gateways internal to the IP network, as well as DNS servers and other network control devices that need to be set up and maintained by the VoIP service provider, depending on how the network is architected.

The bearer packets are transmitted over the packet-switched network using UDP because it is not necessary to try to correct for lost packets on a voice call since the call is happening in real time and any such correction would cause jitters on the call. Therefore, it would be impractical to use an error-correcting protocol such as Transport Control Protocol (TCP).

Heretofore, there is a need to provide contextual messaging methods and systems, wherein the particular messages provided to a voice customer are based on keywords extracted from that customer's telephone conversation using speech recognition technologies or other telephony data. The messages can include different types of information (e.g., advertisements, weather, transportation routes, local and foreign news, schedules, historical information, and the like).

SUMMARY

The disclosure provides a system, method, and computer program product for supplying at least one targeted message to a client device in communication with the server. An analyzer engine analyzes telephony data and generates user profile information based on that data. A database stores messages. A search engine queries the database using the user profile information to retrieve one or more of the messages, and a broadcast engine communicates one or more of the retrieved messages to a client device.

BRIEF DESCRIPTION OF THE DRAWINGS

The features and advantages of the present disclosure will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION

Figure 1:
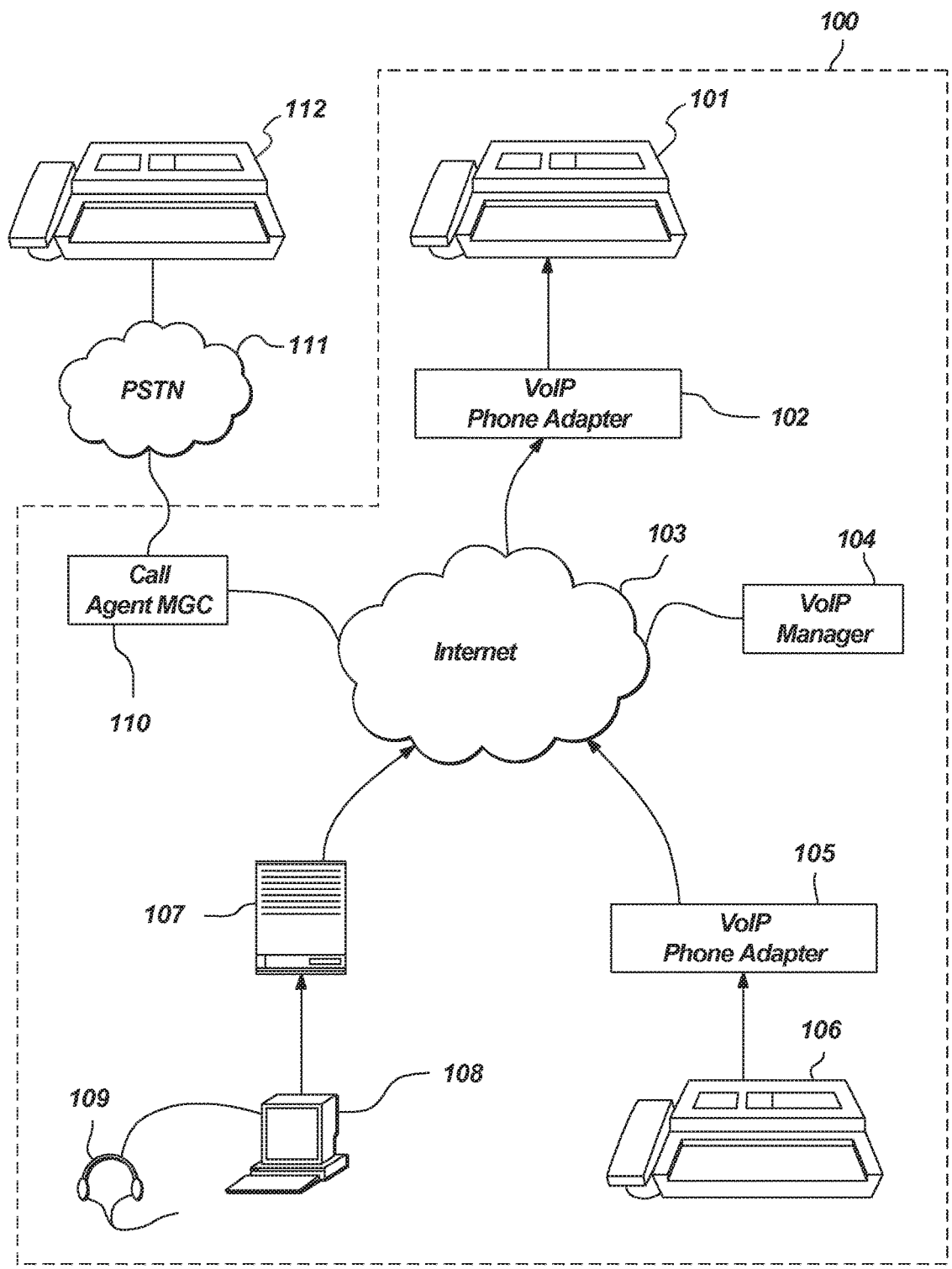
FIG. 1 is a diagram depicting a VoIP system.

The present disclosure is directed to a system, method, and computer program product for creating user profile information from telephony data, which, in turn, is used to retrieve and display advertisements.

The present disclosure provides a solution to the needs described above by allowing such VoIP consumers to receive targeted messages such as advertisements, weather, bus routes, news, schedules, and the like, which are both less annoying than non-targeted messages because they correlate to the interests of the consumer and more desirable to content providers such as advertisers, because they are more likely to result in a sale of a product or service.

With the proliferation of packet-based voice services such as VoIP, such a targeted messaging system as the one described by the present disclosure has now become practical. The increase in speed of Broadband Internet connections has allowed more people to have fast Internet connections that can be the basis for VoIP services. Also, the continuing refinement of speech recognition technologies allows for that technology to be utilized according to the present disclosure in order to generate user profile information that can be used to retrieve targeted messages.

An exemplary embodiment of the present disclosure is a method of providing targeted advertisements for consumers by creating user profile information based on telephony data using speech recognition and calling history to provide the targeted advertising. It should be noted that this example is only one possible implementation of the present disclosure and is not meant to limit the disclosure to this particular embodiment. After reading the following description, it will be apparent to one skilled in the relevant art how to implement the present disclosure in alternative embodiments (e.g., two-way information distribution networks such as satellite and wireless terrestrial networks utilizing VoIP or other conventional or later-devised voice communications service).

It should also be noted that the present disclosure could be utilized to deliver other types of targeted information to consumers, aside from advertisements, such as weather reports, news, bus routes, and schedules, points of interest, and the like. For example, if the consumer is discussing museums and is in the vicinity of a museum as determined from the telephony data, one system embodiment of the present disclosure might provide the consumer with information about the nearest museums and/or directions such as train or bus routes to the museums.

In one embodiment of the present disclosure, the method of providing targeted advertisements to a consumer using a VoIP telephone service includes the steps of converting the user's speech from a telephone call into text data through speech recognition software, sending the text data to a server, extracting keywords from the text data, using those keywords to select targeted advertisements stored in a database, and then providing the selected advertisements to the consumer.

In this embodiment a user can be provided with the most relevant and appropriate advertisements in real time. In this manner, the advertisements may be specifically chosen to correspond to the subject of the consumer's conversation. The targeted advertisement may be provided to the consumer as text, images, audio, and/or video, and in some cases, the advertisement may be provided to the consumer either immediately after the conversation is over, right before the next call made by the consumer, or while the conversation is taking place. For example, if the consumer is connected to a computer, the advertisement may be displayed in the consumer's Web browser, or if the consumer is using a mobile phone, the advertisement can be played on the video screen of the mobile phone. Optionally, headphones can be connected to the mobile phone, or a speakerphone feature can be used with the mobile phone to allow easier access to the phone's display. Alternatively, user profile information can be stored, and advertisements may be provided to the user at a later time.

Another aspect of the present disclosure encompasses a method that provides targeted advertisements through the steps of storing the consumer's call history, then analyzing the call history to determine user profile information based on one or more of the following data: date, time, and duration of telephone calls placed and received, name, type, geographical information, Standard Industrial Classification (SIC) code for businesses, if applicable, and reverse lookup information about the callers making or receiving the telephone call at the far end. The method may further include the steps of inserting collected user profile information into a database, selecting targeted advertisements from a database using the user profile information, and providing the advertisements to the consumer through text, sound, image, and/or video. For example, if a consumer frequently dials the number of a life insurance business, life insurance-related advertisements can be provided to the consumer.

A number of different available technologies to perform speech recognition may be used. In one embodiment of the present disclosure, speech recognition is performed using hidden Markov models (HMMs). However, other types of speech recognition technology may be used, some of which are described in "Sphinx-4: A Flexible Open Source Framework for Speech Recognition" (Walker, et al., Sun Microsystems Inc., 2004), which is hereby incorporated by reference in its entirety.

Many ways of performing speech recognition to convert voice data into text data can be implemented. For example, such conversion could take place on either a server or on a client. Additionally, audio streams may be analyzed either in real-time or on a delayed basis. It may be more convenient to convert the audio stream into text data in real-time on the client side (the point on the network where the consumer is speaking). If not, then, because it may be the case that the voice packets in a VoIP call will normally be transmitted directly to the recipient without passing through the server performing the speech recognition, it might be necessary to also transmit those same data packets containing the voice data separately to the server performing the voice recognition. Therefore, under those circumstances, it would save time and bandwidth to convert the voice to text data at the client side, and then only transmit the converted text data to the advertising server. In this scenario, once the text data is received at the server, it can be used to retrieve targeted advertisements which are then transmitted back to the client. Alternatively, the data packets or the text data may be saved, cataloged, and/or indexed in a database for later processing.

The server may also analyze (or provide additional analysis of) the text data generated from the consumer's conversation. In one embodiment, instead of simply using the text data to directly select the generated text data, other data may be processed first to further refine the user profile information before it is used. One way to analyze the text data is to calculate keyword densities in the converted text, i.e., the number of times a word or phrase appears in the text. The more numerous keywords may be used preferentially to select advertisements more likely to interest the consumer.

As mentioned above, either in addition to the text data, or instead of the generated text data, one or more of the following additional types of information can be taken or derived from the telephony data arising out of a telephone call (and preferably a VoIP call): number and party dialed, Standard Industrial Classification (SIC) code and industry of the number dialed, existing call history, and the content of the user's real-time conversation. The advertisement database can be indexed on any one or more (up to all) of these data types, in addition to, or apart from, having a keyword index.

Using the present disclosure, a VoIP service provider can create a revenue stream from the advertisers supplying the targeted advertisements. This revenue, in addition to increasing profits for the service provider, can offset some or even all of the costs associated with providing the VoIP services. Customers may, for example, make free long distance calls in exchange for receiving targeted advertisements through its service. The service provider might also have a no advertisement option for customers who choose to pay more for the voice services in order to avoid the advertisements.

Using an embodiment of the present disclosure that provides for real-time targeted advertisement, a customer might say "life insurance" during his or her phone conversation, and the system of the disclosure, after converting the phrase to text, could quickly provide a life insurance advertisement to that consumer.

The advertisements may be provided audibly and/or visually and can constitute one or more of text, sounds, images, and/or video. The advertisement may be played before, during, or after the consumer makes a call. If played after the call, the advertisement could be played immediately after, at some later time, or right before the next call is placed by the consumer.

The advertisement may be a co-registration advertisement. For example, when a consumer visits a website and decides to subscribe or join, the person generally will provide personal information such as name, e-mail address, and mailing address. A co-registration advertisement would, optionally, offer that consumer another product or service, such as the opportunity to subscribe to other registration-only web sites without having to retype all of the required information. The following is an illustrative example: after consumer A registers to become a member of a website that offers a joke-of-the-day, he or she is offered the opportunity to also subscribe to the cartoon-of-the-day website without having to fill out another registration form.

A co-registration advertisement that might be used according to the present disclosure could be an opt-in co-registration advertisement, which is when a person viewing the co-registration advertisement accepts the additional offer or offers through an indicating action such as by clicking a checkbox or pressing a button.

Another co-registration advertisement that might be used according to the present disclosure could be an opt-out co-registration advertisement, where the acceptance of the additional offer is pre-checked, and has to be unchecked if the consumer does not want it.

A third type of co-registration advertisement that might be used according to the present disclosure is a custom co-registration advertisement. A custom co-registration advertisement may require additional information from the consumer specific to the additional co-registration offer. For example, a custom co-registration offer to subscribe to a car maintenance website might require that the consumer indicate the type of car he or she owns.

FIG. 1 depicts a diagram showing the components of a VoIP system 100. This diagram shows three potential VoIP consumers using the Internet as their IP network for packet transmission. One consumer is represented by telephone 101 attached to a VoIP telephone adapter 102. Normally the VoIP telephone adapter 102 will convert voice traffic from the telephone 101 into data packets for transmission over an IP Network 103, which in one embodiment is the Internet. The VoIP telephone adapter 102 is capable of supporting the protocols used for the VoIP service, e.g., H.23 or SIP for call control, and UDP/IP for bearer transmission. In addition, the VoIP telephone adapter 102 supports call features that are used on the telephone 101, such as, for example, caller identification, call transfer, or three-way calling. Often these call features are provided for in the call control protocol. The VoIP telephone adapter 102 may optionally be combined with the telephone 101.

In another embodiment of the present disclosure, system 100 is a two-way information distribution network such as satellite and wireless terrestrial networks, which utilizes VoIP or a different protocol for providing a voice communications service. It should also be understood that later-devised services can be used instead of a VoIP service and still be within the scope of the disclosure.

FIG. 1 also shows another telephone 106 and VoIP telephone adapter 105 for a second consumer to place and receive phone calls over network 103. Alternatively, a consumer might utilize a computer 108 (optionally with headphones/microphone 109) connected to the Internet via a cable modem 107 to place and receive VoIP calls.

When the consumer at telephone 101 places a call to the consumer at telephone 106, control data is sent from the VoIP telephone adapter 102 to the VoIP manager 104. This control data contains the destination of the call, e.g., the telephone number of the VoIP telephone 106. VoIP manager 104 determines the IP address corresponding to telephone 106, e.g., the IP address of the VoIP adapter 105, initiates the telephone call by transmitting control data to the respective VoIP adapters, which, in turn, causes the telephone 106 to ring. The VoIP manager 104 also communicates the IP address of the respective VoIP telephone adapters back to each of the VoIP telephone adapters involved in the call so they can send the voice data directly to each other over the network 103.

Once the call is initiated, data packets containing the voice data are sent from the VoIP telephone adapter 102 directly to the IP address of VoIP telephone adapter 105, where they are converted back into a voice stream for playback on the telephone 106. The same process occurs in the other direction, with data packets being sent from VoIP telephone adapter 105 to VoIP telephone adapter 102, where they are converted back into a voice stream for playback on the telephone 101.

Many calls made from a telephone on a particular VoIP network may not be destined for telephones on the same network. In such case, a gateway 110 (also referred to sometimes as a media gateway) can be used to connect with other networks. A media gateway controller ("MGC") within gateway 110 handles the registration and management of resources at the media gateway and exchanges messages with central office switches via a signaling gateway. A media gateway controller is sometimes called a call agent, call controller, or softswitch. Gateway 110 connects to the PSTN network 111. Gateway 110 has an IP address on the Internet known by the VoIP Manager 104 for receiving VoIP voice packet data from the Internet and can also convert a packet data to TDM data, establish a circuit on the PSTN network 111 and transmit control and voice data using TDM to complete the call coming from the VoIP network to send the data to, for example, a telephone 112 on PSTN 111. The gateway 110 also can initiate a call on the VoIP network 100 that comes, for example, from the PSTN network 111, by sending control data to the VoIP manager 104 and receiving the IP address of a destination VoIP telephone adapter from the VoIP manager 104. Gateway 110 converts the TDM voice data from the PSTN network 111 into packets and transmits that packet data directly to the IP address of the destination VoIP telephone adapter.

Figure 2:
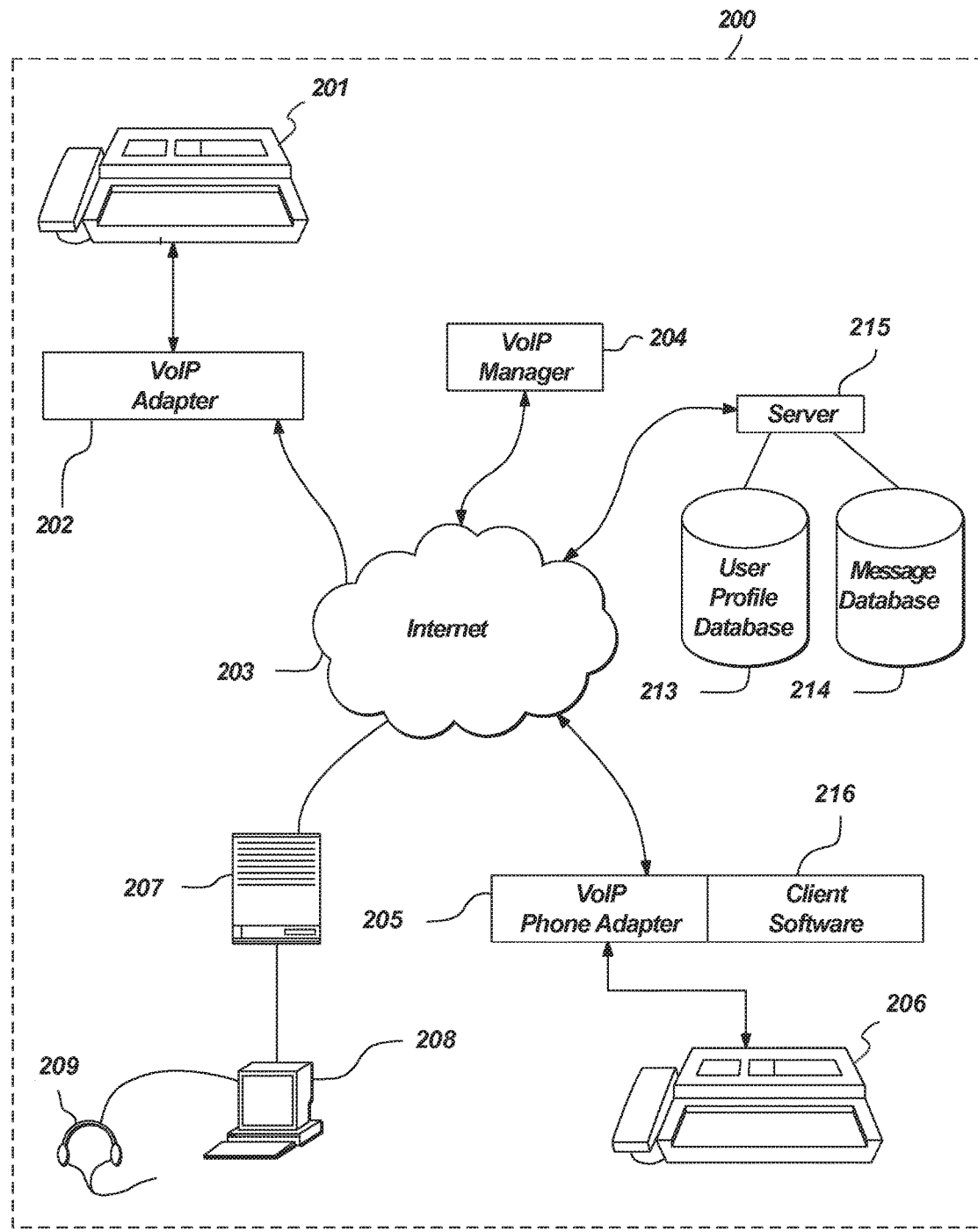
FIG. 2 is a diagram depicting a VoIP system enabled to implement one embodiment of the present disclosure.

FIG. 2 is a diagram depicting a VoIP system 200 enabled to implement one embodiment of the present disclosure. In one embodiment of the present disclosure, client software 216 resides in, or alongside, the VoIP phone adapter 205. When a call is placed, for example, from telephone 206 to telephone 201 through network 203 and VoIP adapter 202, the VoIP adapter 205 will send the control data over the network 203 to the VoIP manager 204 to initiate the call. A call could also be placed from a computer 208, using headphones 209 and a cable modem 207. The control data, or some extracted part of the control data is also sent to a server 215. Server 215 can be apart from or integrated into the VoIP manager 204, or a combination of both. The control data is used as user profile information to retrieve data including, for example, advertisement information from the advertisement database 214, which in turn is transmitted back to the VoIP phone adapter 205 for output on the telephone 206. Output of data can constitute playback of audio, and/or the display of text, graphics, images, and videos, and the like. The retrieved data also need not be limited to advertisement data and can, for instance, include other information (e.g., weather forecast information, public transportation information, local news, to name a few). In addition, or alternatively, the user profile information can be saved in a user profile database 213.

In another embodiment, the client software 216 optionally also includes voice recognition software which analyzes the voice data, either in packet form from the VoIP phone adapter 205, or directly from the telephone 206. The voice recognition software converts this voice data into text data. The text data is then transmitted over the network 203 to server 215 where it can either be stored in a user profile database 213 or used to select targeted advertisements from the advertisement database 214, which are then transmitted back to the VoIP phone adapter 205 for display to the consumer using the telephone set 206.

Optionally, the user profile database 213 could be stored in the device hosting the VoIP phone adapter 205 local to the telephone 206 instead of on the server 215. In this manner, one server 215 can host many clients without adding additional identifying information for each client to the server's database since the user profile information is distributed for each client. It should be noted that, according to the present disclosure, the targeted advertisements do not have to be provided to the consumer in real time. Since the user profile information can be stored in a user profile database 213, it can be used to later select advertisements from the advertising database 214, or the user profile information can be further processed to refine the advertisement selection criteria.

Figure 3:
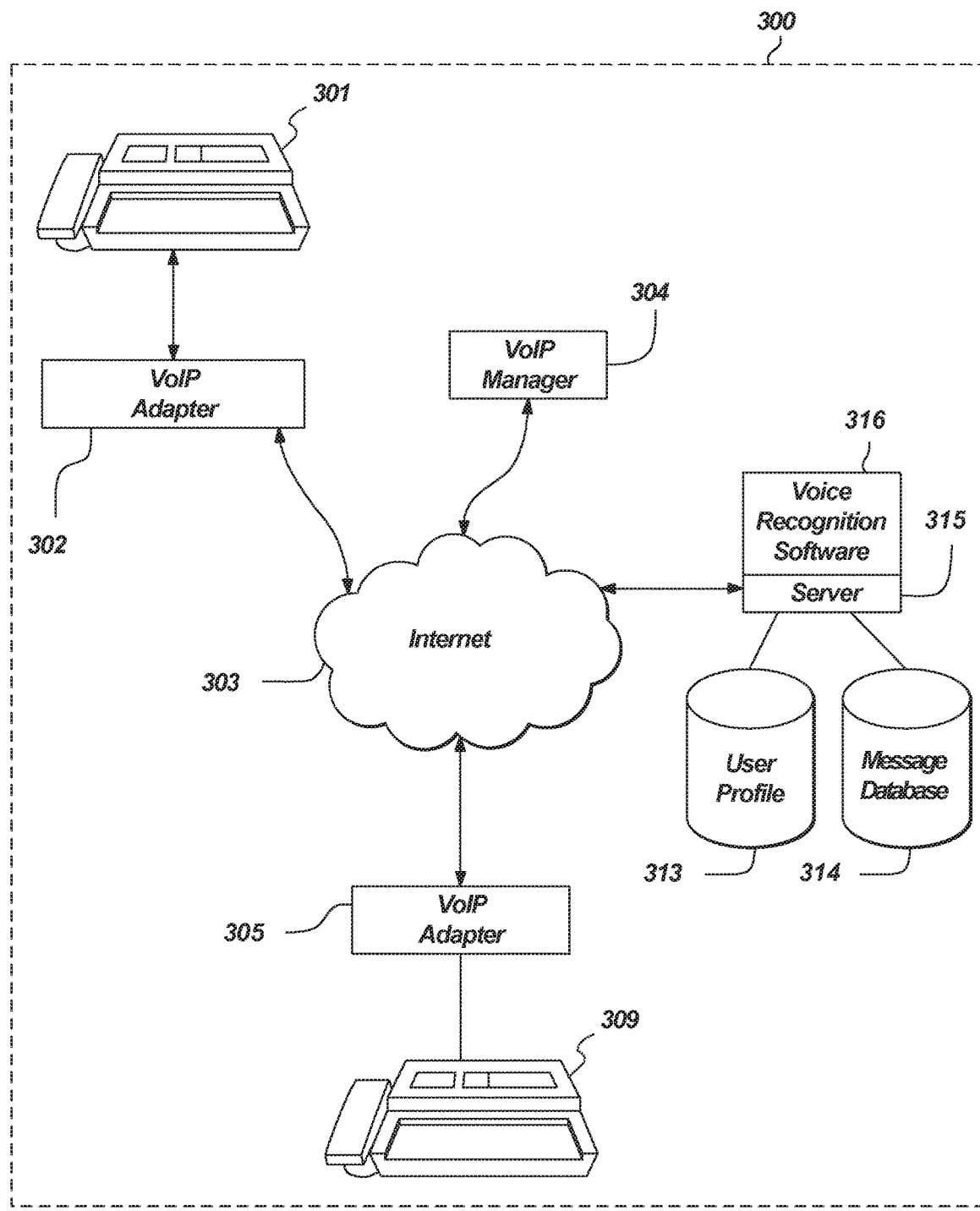
FIG. 3 is a diagram depicting a VoIP system enabled to implement a second embodiment of the present disclosure.

FIG. 3 shows another embodiment of the present disclosure where the voice recognition software 316 runs on the server 315 rather than a client, such as VoIP adapter 305. Similar to FIG. 2, a call can be initiated by VoIP-configured telephone 309, by the VoIP adapter 305 at the initiation end of the call transmitting control data to a VoIP call manager 304, through the network 303. The VoIP call manager 304 will send control data to the VoIP adapter 302 at the destination end of the call, which, in turn, will cause the telephone 301 to ring. In one configuration, the voice recognition software 316 runs its conversion of voice data into text data by having the voice data locally available on the server 315. Under that scenario, the voice packets, or bearer data, are transmitted to the server 315 for analysis by the voice recognition software 316. Another possible configuration is to have the voice recognition software launched off of the server 315 but remotely accessing the bearer voice data at the client (e.g., VoIP adapter 305). This can be accomplished in at least two ways. The voice recognition software 316 can be launched from the server 315 but run locally on the client once launched. Alternatively, the voice recognition software 316, runs on the server 315 but remotely accesses the voice bearer data residing on the client through a data pipe (not shown).

Once the user profile information is generated, it can be stored in the user profile database 313 and/or used to select targeted advertisements from the advertising database 314. Once selected, targeted advertisements are transmitted back to the VoIP adapter 305 and then communicated to the consumer (e.g., the data is output by playback of audio and/or the display of text, graphics, images, and videos, and the like). It is also possible, as an alternative, to store the user profile information locally on the client in this configuration.

Figure 4:
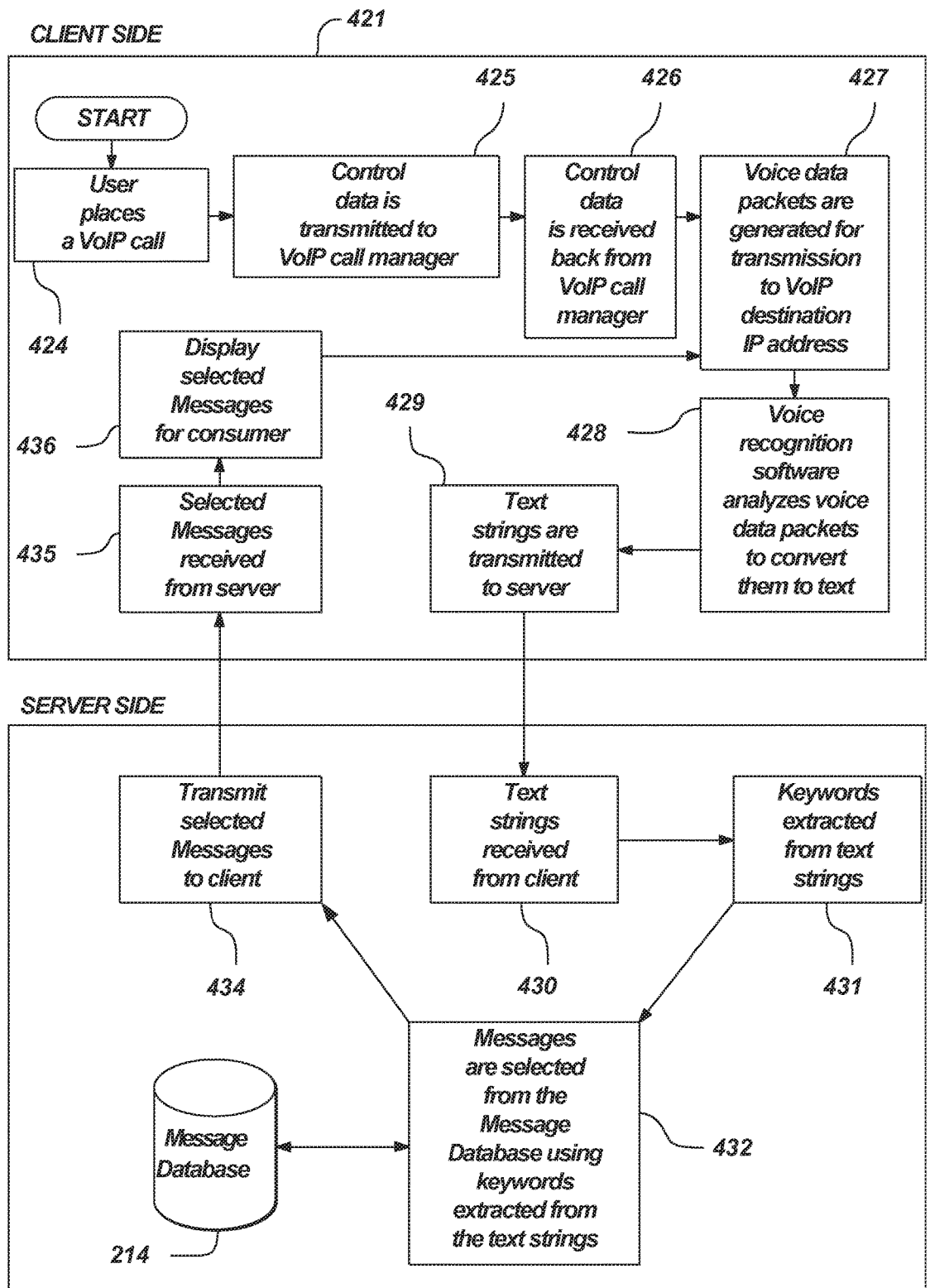
FIG. 4 is a flow diagram describing steps of a process according to the present disclosure.

Referring to FIG. 4, a flowchart illustrating the process of providing a targeted advertisement to a user, according to one embodiment of the present disclosure, is shown. The process is divided into two sides, the client side 421 and the server side 422. A user obtains or is provided with the client software application that implements functionality according to the present disclosure on the client side. One exemplary way of obtaining the software application is to download it from a remote website. Another exemplary way of obtaining the software application is from a computer-readable medium provided in the form of a CDROM, DVD, memory device, and the like.

The user places a VoIP call as shown in step 424. This process may take place in a computer or through a telephone. Particularly, a user enters a telephone number to be called by selecting physical buttons on a telephone, selecting numbers on a dialpad displayed on a webpage, or by saying the number into a microphone which, in turn, are voice recognized, to name a few.

After initiating a call in step 424, control data is transmitted to the VoIP call manager 204 in step 425 which, in turn, sends control data to both the origination end and destination end of the call which is received at the client (e.g., VoIP adapter 205) in step 426 to establish the connection. Once the connection is established, the voice data packets will be transmitted directly back and forth over the packet-switched network using the UDP protocol in step 427. The voice data are converted to text strings using voice recognition software in step 428. The text strings are transmitted to the server side 422 in step 429, and received by the server in step 430. On the server side, keywords are extracted from the text strings in step 431. At this point, the server might optionally store those keywords as user profile information for the particular user that initiated the call. The keywords are then used to select targeted information (e.g., advertisements) from a database such as advertisement database 214 in step 432. The targeted information is transmitted back to the client in steps 434 and 435. Finally, the targeted advertisements are output on a client device to the user in step 436. The process is then repeated if the call is still in progress, going back to the step 427 where additional voice data is generated for transmission to the VoIP destination IP address which is then converted into text strings using voice recognition software.

Alternatively, although not shown in the figure, the conversion of the voice data to text strings in step 428 may be carried out in the server side 422. In such alternative embodiment, the voice data packets may be transmitted to the server. Once at the server side 422, a copy of the voice data may be saved in a database or as a file on the server side 422. The voice data may also be converted to text strings using a speech recognition software on the server side 422.

The process of keyword extraction 431 may also be performed on the client side 421. In any event, the keywords may then be saved into a database (not shown in the diagram). The database contains a plurality of advertisements. The advertisement database may associate keywords with specific advertisements; so when keywords are extracted from the voice data through speech recognition software, they are used to select advertisements from the advertisement database by searching for the advertisements' associated keywords. For example, an advertisement on a travel package may have the following keywords associated therewith: travel, package, flight, airplane, vacation.

In step 432 the advertisements are selected based on keywords that were converted from the voice data. Once it has been determined that a corresponding advertisement exists in the database, the information of the corresponding advertisement is retrieved, as shown in step 432. The retrieved advertisement may be sent to the user to be displayed on the user's computer display, as shown in steps 434-435.

In the alternative, subsequent to the user placing a call in step 424, the number that the user enters on the telephone may be inserted into a database for use as a keyword. Optionally, the number can be used to do a reverse lookup for additional information that may also be used as a keyword to select targeted advertisements. For example, the reverse lookup might find the type of business of the dialed number (travel agency, life insurance, hardware store, etc.), or the Standard Industrial Classification (SIC) code of the business. Thus, for example, if the user dials a travel agency number, it could be determined through the reverse lookup that the dialed number is a travel agency, then these keywords "travel" and "agency" or the phrase "travel agency" might be used as the user profile information to select the targeted advertisements.

In one embodiment, keyword densities may be calculated from the converted text data. The algorithm used for such a calculation may be simple, e.g., the number of times a word is spoken in a conversation is tracked and that number is stored along with the word in the user profiles' information for that consumer. When the keywords are used to select the targeted advertisements in step 432, the word with the highest density number (the word spoken the most times) could be used first to select advertisements. If no advertisements are found, then the next most frequent word can be used to select at least one advertisement from the advertisement database for display to the consumer.

In another embodiment, call history may be stored on the server in a user profile database. The consumer's dialing habits and other call information can be collected based on, for example, the date, time, and duration of calls placed and received, party information, e.g., name, type (business, residential, other), geographical information, SIC code for businesses, and reverse lookup number information. Such information may optionally be used as keywords or converted into keywords by suitable algorithms that analyze such data. Those keywords can then be used to select targeted advertisements from an advertisement database.

The VoIP service provider may set up its VoIP service using Session Initiation Protocol (SIP) as the control protocol. Alternatively, the application and/or the server may use H.323 as the control protocol.

The server may store the advertisement database including a plurality of advertisements with associated keywords. There might be a one-to-many relationship between advertisements and keywords. There may also be a priority system amongst keywords, where for example, the database schema could be setup so that certain keywords will bring back several different advertisements, but the advertisements will be selected in their order of highest priority for the keywords, so the most relevant advertisement according to the priority number might be sent to the consumer for display first, followed by the highest priority advertisement, and so on.

As described above, information associated with the keywords (e.g., the advertisements) can be displayed to the consumer by being played audibly and/or shown visually through text, images, or videos. The display may come out on the consumer's computer, or directly on the phone, or other means of communication.

A general purpose computer connected to a packet-switched network is sufficient for performing the operation on the client side according to the present disclosure. It might also be desirable for the consumer to have a handset (telephone) on the client-side. Alternatively, a handset may be used with a phone adapter computing device instead of a general purpose computer to avoid having to use the computer to initiate a telephone call.

If there is no handset used in conjunction with a computer, then the computer can be configured with peripherals to make a phone call, such as a microphone and speaker. A headset is one possible peripheral that could be used to accomplish this according to the present disclosure. The computer system can include a display that shows graphics, text, and video for displaying the targeted advertisements.

The computer would also need to have a communications interface, such as a landline or wireless network card, or other means of two-way network communications adapter. A network card allows the computer to connect to a packet-switched network, which will be necessary to transmit voice, text, and control data over the network, to establish and maintain the telephone call as well as to transmit user profile information, text strings, voice data and targeted advertisements. Examples of the communications interface may include a modem, a network interface (such as an Ethernet card), a communications port, a Personal Computer Memory Card International Association (PCMCIA) slot and card, etc.

While various embodiments of the present disclosure have been described above, it should be understood that they have been presented by way of example, and not limitation. It will be apparent to persons skilled in the relevant arts that various changes in form and detail can be made therein without departing from the spirit and scope of the present disclosure. Thus, the invention should not be limited by any of the above-described exemplary embodiments, but should be defined only in accordance with the following claims and their equivalents.

In addition, it should be understood that the figures illustrated in the attachments, which highlight the functionality and advantages of the present disclosure, are presented for example purposes only. The architecture according to the present disclosure is sufficiently flexible and configurable such that it may be utilized (and navigated) in ways other than that shown in the accompanying figures.

Further, the purpose of the foregoing specification and abstract are to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The specification and abstract are not intended to be limiting as to the scope of the invention in any way. It is also to be understood that the steps and processes recited in the claims need not be performed in the order presented.

What is claimed is:

1. A computer-implemented method of providing a targeted message to a client device, the method comprising:
    receiving voice data from the client device;
    converting at least a portion of the voice data into text data;
    generating user profile information for a user of the client device based at least in part on call history comprising a plurality of calls involving the user;

selecting the targeted message from a database comprising a plurality of messages, based at least in part on the text data and the user profile information; and transmitting the targeted message to the client device.

2. The method of claim 1, wherein the targeted message includes at least one of sound, text, and image data.

3. The method of claim 1 further comprising extracting keywords from the text data, wherein the targeted message is selected based at least in part on the keywords.

4. The method of claim 1, wherein the call history comprises date, time, and duration of telephone calls placed and received.

5. The method of claim 1, wherein the call history comprises one or more of name information, call type information, geographical information, business information, or reverse lookup information.

6. A non-transitory computer-readable medium having instructions stored therein that, in response to execution by one or more computers in a computer system, cause the computer system to:

convert voice data into text data, wherein the voice data is received from a client device;

generate user profile information for a user of the client device based at least in part on call history comprising a plurality of calls involving the user;

select a targeted message from a database comprising a plurality of messages, based at least in part on the text data and the user profile information; and transmit the targeted message to the client device.

7. The non-transitory computer-readable medium of claim 6, wherein the targeted message includes at least one of sound, text, and image data.

8. The non-transitory computer-readable medium of claim 6 further having instructions stored thereon that, in response to execution by the one or more computers in the computer system, cause the computer system to extract keywords from the text data, wherein the targeted message is selected based at least in part on the keywords.

9. The non-transitory computer-readable medium of claim 6, wherein the call history comprises date, time, and duration of telephone calls placed and received.

10. The non-transitory computer-readable medium of claim 6, wherein the call history comprises one or more of name information, call type information, geographical information, business information, or reverse lookup information.

11. A server programmed to:

convert voice data into text data, wherein the voice data is received from a client device;

generate user profile information for a user of the client device based at least in part on call history comprising a plurality of calls involving the user;

select a targeted message from a database comprising a plurality of messages, based at least in part on the text data and the user profile information; and transmit the targeted message to the client device.

12. The server of claim 11, wherein the targeted message includes at least one of sound, text, and image data.

13. The server of claim 11 further programmed to extract keywords from the text data, wherein the targeted message is selected based at least in part on the keywords.

14. The server of claim 11, wherein the call history comprises date, time, and duration of telephone calls placed and received.

15. The server of claim 11, wherein the call history comprises one or more of name information, call type information, geographical information, business information, or reverse lookup information.

* * * * *